United States Patent Office 3,437,628

Patented Apr. 8, 1969

3,437,628

IMPACT RESISTANT NITRILE POLYMER ARTICLES

Ralph E. Isley, Northfield, and Richard C. Adams, Chardon, Ohio, assignors to Standard Oil Company, Cleveland, Ohio, a corporation of Ohio No Drawing. Filed Sept. 6, 1966, Ser. No. 577,184
Int. Cl. C08f *45/40, 47/14*
U.S. Cl. 260—31.8 7 Claims

ABSTRACT OF THE DISCLOSURE

Shaped articles of improved impact strength and substantially free from primary solvent such as dimethyl formamide may be obtained from oriented acrylonitrile polymers prepared from a solvent system in which a lower alkyl ester of certain polybasic acid is incorporated as secondary solvent prior to forming the article.

The present invention relates to the manufacture of nitrile polymer shaped articles of improved impact strength and more particularly pertains to the process for preparing oriented acrylonitrile polymer articles from a solvent system having improved impact strength by incorporating a lower alkyl ester of certain polybasic acids into the solvent system prior to forming said articles.

Nitrile polymers useful in the process of this invention include those resinous homopolymers and interpolymers described in U.S. Patent No. 3,253,058; in the copending U.S. patent application of R. E. Isley, R. C. Adams and L. E Ball, Ser. No. 377,041, filed June 22, 1964; and in the copending U.S. patent application of L. E. Ball, Ser. No. 421,612, filed Dec. 28, 1964. The preparation and orientation of films and other shaped articles of the novel nitrile polymers useful in the present process is more fully described in the foregoing patent and copending U.S. patent applications, as well as in the copending U.S. patent application of R. E. Isley and K. E. Blower, Ser. No. 466,423, filed June 23, 1965, now Patent No. 3,380,-949, granted Apr. 30, 1968.

We have now found that the incorporation of from about 1 to 30% and more preferably from about 2 to 5% by weight based on the nitrile polymer of a lower alkyl ester of a polybasic carboxylic acid (hereinafter referred to as secondary solvent) in the primary solvent employed in preparing oriented articles and particularly oriented films and sheets, results in a final oriented film or sheet containing substantially no primary solvent and having unexpectedly improved impact strength.

The nitrile polymers useful in the present process include homopolymers and copolymers of a nitrile monomer having the structure

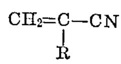

$$CH_2{=}\underset{\displaystyle R}{\underset{|}{C}}{-}CN$$

wherein R is a hydrocarbon group, hydrogen or halogen. Representative nitriles of this type are acrylonitrile, methacrylonitrile, alphachloro acrylonitrile, etc. Preferred nitrile monomers are acrylonitrile and methacrylonitrile and most preferred is acrylonitrile. The nitrile polymers useful in the present invention include those containing about 70% by weight or more of polymerized nitrile monomer of the foregoing type. More preferred are nitrile polymers containing 90% or more by weight of polymerized nitrile monomer and most preferred are nitrile polymers containing at least 95% by weight of polymerized nitrile monomer.

It is also contemplated to be within the scope of this invention to replace up to about 10% and preferably about up to 5% by weight of the acrylonitrile in the nitrile polymer with one or more polymerizable monoalkenyl or polyalkenyl monomers copolymerizable with acrylonitrile.

Useful monoalkenyl monomers include the acrylate esters such as methyl acrylate, ethyl acrylate, the propyl acrylates, the butyl acrylates, the amyl acrylates, the hexyl acrylates, cyclohexyl acrylate, phenyl acrylate, the octyl acrylates and the like; the methacrylate esters such as methyl methacrylate, ethyl methacrylate, the propyl methacrylates, the butyl methacrylates, the amyl methacrylates, the hexyl methacrylates, cyclohexyl methacrylate, phenyl methacrylate, the decyl methacrylates and the like; vinyl esters such as vinyl acetate, vinyl propionate, the vinyl butyrates, vinyl benzoate, isopropenyl acetate and the like; the vinyl aromatics such as styrene, alpha-methyl styrene, vinyl toluene, the vinyl xylenes, the vinyl naphthalenes, isopropenyl benzene and the like; vinyl amides such as acrylamide, methacrylamide, N-methyl acrylamide, vinyl benzamide, N-vinyl pyrrolidone and the like; the vinyl halides such as vinyl chloride, vinyl bromide, vinyl fluoride, vinylidene chloride, vinylidene fluoride, dichloro difluoro ethylene, tetrafluoroethylene and the like; olefins such as ethylene, propylene, isobutylene, butene-1 and the like.

Useful polyalkenyl monomers include those having at least two vinyl groups per molecule such as allyl acrylate, allyl methacrylate, diallyl maleate, diallyl fumarate, ethylene glycol dimaleate, diallyl itaconate, methallyl acrylate, divinyl ether, diallyl ether, dimethallyl ether, ethylene glycol dimethacrylate, 1,1,1 - trimethoxypropanedimethacrylate, glyceryl triacrylate, sucrose hexaacrylate, diallyl phthalate, triallyl cyanurate, 2,2,5,5 - tetramethyl-1,5-hexadiene, 1,5-hexadiene, 1,6-heptadiene, 1,7-octadiene, 1,8-nonadiene, divinyl biphenyl, divinyl naphthalene, divinyl benzene, trivinyl benzene, diallyl benzene, diisopropenyl benzene, allyl allyloxyacetate, ethylidene dimethacrylate, methylene dimethacrylate, diallyl melamine, diallyl isomelamine, triallyl melamine, triallyl aconitate, triallyl phosphate, tetraallyl silane, tetravinyl silane, diallyl divinyl silane, tetraallyl germane, tetravinyl tin, tetravinyl germane, triacryloyl perhydrotriazine, trimethacryloyl perhydrotriazine, divinyl spirobi, methylene-bis-acrylamide, ethylene diacrylamide, N-allyl acrylamide, N,N-diallyl acrylamide, N,N-dimethallyl methacrylamide, polyallyl ethers of polyhydric alcohols such as tetraallyl pentaerythritol, hexaallyl sucrose, hexaallyl inositol, hexaallyl sorbitol, hexavinyl sucrose and the like and others.

The acrylonitrile polymers useful in this invention may be prepared in any convenient manner such as by batch, bulk, solution, emulsion or suspension polymerization techniques, all of which are well known to those skilled in the art. For best results, however, it is preferred that the acrylonitrile polymers be prepared in an aqueous medium in the presence of an emulsifier and a redox catalyst usually comprised of a water-soluble peroxygen compound and an oxidizable sulfur compound as promoter.

The polymerization reaction may be carried out by adding all of the monomer to the reaction mixture at once or in increments or in a continuous manner during the course of the reaction. A suitable emulsifier, surface active agent or dispersing agent is preferably used during the polymerization procedure in the preparation of the acrylonitrile polymers of this invention.

In a representative polymerization procedure, which is not meant to limit the scope of this invention, an aqueous medium containing about 0.1 to 2% of a perdisulfate salt, about 0.05 to 0.5% of a polymerization adjuvant, such as sodium bisulfite, and about 0.15 to 5% of a suitable emulsifier and the monomer is placed in an appropriate vessel which is provided with a means of agitation, such as stirring or shaking. The air in the free space of the vessel is usually displaced by an inert gas such as nitrogen. The mixture is thereafter brought to a temperature in the range of about 0° to about 100° C. or higher with continuous or intermittent agitation until polymerization has proceeded to the desired extent (usually 70–100% conversion of monomers to polymer).

At the conclusion of the polymerization, the polymers useful in this invention may be isolated as finely divided powders by a variety of methods. For example, the dispersion may be sprayed into a heated and/or evacuated chamber whereby the water is removed as vapor and the polymer falls to the bottom of the chamber. When the polymer is prepared in sufficiently high solids, i.e., 15% or higher, it can often be isolated as a fine, granular powder simply by filtration or centrifugation. The polymer may also be isolated by cooling the dispersion below the freezing point of the aqueous medium or by the addition of a large volume of a lower aliphatic alcohol such as methanol or ethanol. A satisfactory procedure consists in adding an appropriate amount of an electrolyte solution to the diluted aqueous dispersion with rapid agitation at a temperature just below the point at which the precipitated particles tend to adhere. This procedure yields a polymer in the form of granular particles which are readily filtered and washed. Suitable electrolytes include sodium chloride, sodium sulfate, hydrochloric acid, phosphoric acid, calcium chloride, magnesium sulfate, lead nitrate, lead acetate, stannous chloride and aluminum sulfate. After precipitation of the polymer, it is filtered and washed repeatedly with water to remove traces of electrolyte and dispersing agent which may adhere to the particles. Washing with dilute solutions of caustic soda or ammonium hydroxide assists in removing the last traces of dispersing agent and at the same time yields polymers of improved heat stability. In order to facilitate low temperature drying of the polymers, it is beneficial to employ a final wash with a lower aliphatic alcohol such as methanol or ethanol.

The films useful in this invention can be prepared by any of the known film-forming techniques such as solvent casting, extrusion, calendering, etc. The films can be oriented by known procedures and particularly by procedures described in the aforementioned U.S. patent and copending U.S. patent applications. Nitrile polymer solutions suitable for casting of films may be prepared by dissolving from about 10 to 30% by weight of the nitrile polymer in one or a combination of volatile polar primary solvents such as dimethyl formamide, dimethyl thioformamide, N-methyl-beta-cyano-ethyl formamide, alpha-cyano acetamide, N-methyl pyrrolidone, gamma-butylrolactone, ethylene carbonate, tetramethyl oxamide, epsilon-cyanolactam, 1,3,3,5-tetracryanopentane, dimethyl cyanamide, dimethyl methoxy acetamide, N-formyl morpholine, N-formyl hexamethylene imine, dimethyl sulfoxide, propionlactone, N,N-dimethyl acetamide, dimethyl sulfone, tetramethylene cyclic sulfone, ethylene cyanhydrin, nitromethane, acetonitrile, malononitrile, tris-dimethylamino-phosphine oxide, N,N'-tetramethylmethanephosphonamide, etc., to form a high solids, pourable solution. The preferred primary solvent is dimethyl formamide. Dimethyl formamide alone is an excellent solvent but it is somewhat of a toxic nature and cannot be completely removed from the film and more than 1% by weight of dimethyl formamide remains in the film even after the biaxial orientation and extensive heat-setting treatment. The use of mixtures of dimethyl formamide with another primary solvent, such as ethylene carbonate, helps to cut down on the residual dimethyl formamide in the final oriented film, but this film usually has unacceptable toughness and impact strength. It is indeed unexpected and unobvious that the use of a combination of dimethyl formamide and a secondary solvent, as more fully described below, in the preparation of nitrile polymer film results in films which not only have less than 1% by weight of residual dimethyl formamide but also have excellent toughness and impact resistance.

The secondary solvents useful in the present invention are the lower alkyl esters of polycarboxylic acids and preferably are esters having the formula $R(COOR')_n$ wherein R is a hydrocarbon radical having from about 6 to 12 carbon atoms, R' is an alkyl group having from 1 to 3 carbon atoms and $n$ is an integer from 2 to 4. Most preferred in this invention are esters of the foregoing formula in which R is a hydrocarbon radical having from 5 to 8 carbon atoms and $n$ is 2. Such secondary solvents include dimethyl phthalate, diethyl phthalate, dipropyl phthalate, diisopropyl phthalate, dimethyl terephthalate, diethyl terephthalate, dimethyl isophthalate, diethyl isophthalate, diethyl adipate, dimethyl adipate, dimethyl sebacate, diethyl sebacate and the like. Surprisingly, the higher esters such as dibutyl phthalate, dihexyl phthalate, dioctyl phthalate and the like are commonly used plasticizers in the polymer art for polymeric materials such as polyvinyl chloride but they are not operable in the present invention because they are not compatible with the nitrile polymer and use of these materials as secondary solvents results in weak, cloudy films. The lower alkyl esters of phthalic acid produce an oriented film having improved impact strength by a mechanism which is not understood at the present time. The presence of these secondary solvents in the film forming and orientation process also facilitates the removal of substantially all of the primary solvent from the oriented film.

Films can be formed from solutions or dry blends, with primary and secondary solvents of the polymers embodied herein by extrusion, milling, sheet-casting or other known techniques which involve depositing a uniform film of the polymer-solvent mixture on a smooth, flat surface and removing the solvent from the film by volatilization.

The nitrile polymer film can be oriented by stretching at a selected temperature, usually in a gaseous atmosphere such as air or nitrogen. The nitrile polymer film can also be oriented in two mutually perpendicular directions simultaneously or sequentially to form an oriented film which still may contain solvent. Heat setting of the film accompanied by substantial removal of the solvent is then carried out while holding the film under tension to restrict dimensional change in the plane of the film and thereafter cooling the film and releasing the tension thereon.

In one procedure, using polyacrylonitrile as an example, the cast film, still containing solvent, is passed continuously to a drafter or similar device for longitudinal stretching. In the drafting operation it is desirable to employ temperatures of from about 100 to 260° F. and preferably from about 145 to 180° F. on the hot rolls and the cold rolls preferably are maintained at or near room temperature. The stretch ratio employed in the drafting operation can be from 1.2:1 to 10:1 stretched length-to-original length and preferably from about 2:1 to 4:1. The film, still containing most of the solvent it contained on entering the drafter next is fed continuously into a tenter or similar apparatus where transverse stretching is carried out. On the order of about half of the solvent originally present in the film as it entered the drafter is removed during the tentering operation. The tentering operation is usually carried out at temperatures in the range of from about 100° F. to about 260° F. and preferably from about 145 to 180° F. The ratio of stretching in the tentering operation is about the same as that described in the drafting operation or just a little less. The film is next heat set which comprises holding it so that it cannot retract either laterally or longitudinally and heating it at from about 250 to 485° F. for from a fraction of a second up to about five minutes. Finally the film is cooled to about room temperature and rolled up or cut up in various lengths, etc. Substantially all of the residual solvent is removed from the film during the heat setting operation so that the final cooled film will not contain any more than about 1% by weight of residual primary solvent and more preferably the final film shall be substantially free of residual primary solvent.

The films and other shaped articles embodied in the present invention are outstanding barriers for various gases, water vapor and the like and in this respect they resemble metals more than they resemble other plastics which are commercially available. The films and other articles of this invention also have excellent resistance to attack by most chemicals, they have excellent dimensional stability, excellent resistance to degradation by ultra-violet radiation, they have good electrical properties and excellent mechanical strength including high tensile strength, high tensile modulus, high impact strength and toughness and excellent abrasion resistance. The foregoing and other desirable properties make the films of this invention particularly useful in a wide variety of applications such as magnetic tape, surfacing and laminating, packaging, electrical insulating tape, pressure sensitive tapes, glazing and the like. The films of this inventin can be laminated to plywood, wood, fiber glass panels, aluminum or other metals, paperboard, plastics or similar materials. Many of such laminated structures, as well as the film itself, are satisfactory for both indoor and outdoor use. The films and laminates may be metallized and end uses of a specific nature for laminates include chairs, bench tops, doors, radiant heating panels, thermal insulation, house siding and roofing, curtain wall panels, signs, vending machines, baseboard trim, cabinets, appliances, flooring, awning, baby carriages, tarpaulins, reflector signs, vehicle trim, dry battery covers, wall paper and fuel cells. Metallized film can be cut into fine strips and made into metallized yarn of varying colors.

It is to be understood that those skilled in the art can make various modifications and changes in the compositions and processes described herein without departing from the scope of this invention.

In the following illustrative examples the amounts of ingredients are expressed in parts by weight unless otherwise indicated.

EXAMPLE I

An acrylonitrile copolymer was prepared from the following recipe:

| | Parts |
|---|---|
| (a) Water | 400 |
| (b) Emulsifier (GAFAC RE–610)[1] | 3.5 |
| (c) Ammonium persulfate | 0.5 |
| (d) Potassium metabisulfite | 0.23 |
| (e) t-Dodecyl mercaptan | 0.7 |
| (f) Acrylonitrile | 1.76 |
| (g) Butanediol-1,4-divinyl ether | 0.34 |
| (h) Acrylonitrile | 97.9 |

[1] A mixture of $R—O—(CH_2CH_2O—)_nPO_3M_2$ and $[R—O—(CH_2CH_2O—)_n]_2PO_2M$ wherein $n$ is a number of from 1 to 40, R is an alkyl or alkaryl group and preferably a nonyl phenyl group and M is hydrogen, ammonia or an alkali metal, which composition is sold by the General Aniline and Film Corp.

Ingredients (a)–(e) were charged into a reactor and the temperature was brought to 50° C. with stirring. A nitrogen atmosphere was maintained in the reaction vessel. Ingredients (f) and (g) were added and polymerization of these two monomers was substantially completed in about a 90 minute period. Then the ingredient (h) was added continuously over a 195 minute period while the reaction mixture was maintained at 50° C. and the resulting polymer dispersion was stirred and heated at 50° C. for an additional three hours. The final product was a suspension of polymer in water from which the polymer was readily isolated by filtration. The isolated polymer was washed on the filter and dried in an oven.

The dry polymer prepared as described above was dissolved to form a 17% solution by employing a high speed stirrer and a temperature of 60° C. The solvent employed was a 90/10 mixture of dimethyl formamide/ethylene carbonate. A ten gallon jacketed and stirred pressure autoclave was employed. The solvent was added followed by the polymer with stirring. Agitation was vigorous enough to maintain a uniform suspension in the early stages of dissolving. The suspension was then heated at 55–65° C. and the polymer dissolved readily. This is a low viscosity type of solution preparation as opposed to polymer mastication and dilution in a kneading type of mixer. The resulting polymer solution was filtered by passing it through a screen pack filter built up from stainless steel screens. A 140 mesh stainless steel screen was used which was protected on either side by a 40 mesh screen.

The above solution or dope was cast using a doctor blade in the laboratory or a three roll reverse roll coater on a larger scale. A heated dope and a heated reverse roll coater were used at temperatures of about 160° F. The dope was cast onto a stainless steel endless belt and dried in a three zone circulating air oven.

(A) The film produced in the foregoing manner was then biaxially oriented by passing it through a heated drafter and tenter and finally heat set in the drafter as described above. The first biaxially oriented film had undergone a stretch ratio of 2.3 times on one direction and 2.7 times in the transverse direction. This oriented film was found to have the properties listed in Table I.

(B) Procedure (A) of this example was repeated with the exception that 4% by weight of dimethyl phthalate, based on the weight of acrylonitrile, was included in the solvent. The first biaxially oriented film was found to have the properties given in Table I.

TABLE I

| Polymer | Ultimate tensile, p.s.i.×$10^3$ | | Ultimate Elongation, Percent | | Tensile impact, ft. lbs./in.$^3$ | | Falling dart impact, g./mil | Percent residual DMF |
|---|---|---|---|---|---|---|---|---|
| | MD | TD | MD | TD | MD | TD | | |
| (A) | 16.2 | 28.1 | 15.3 | 47.5 | 274 | 306 | 330 | 2.91 |
| (B) | 22.4 | 17.7 | 57.2 | 20.2 | 1,212 | 1,300 | 372 | [1] 0.83 |

[1] Also contained 1.7% dimethyl phthalate.

EXAMPLE II

Acrylonitrile was homopolymerized in aqueous emulsion with a redox initiator and a mercaptan modifier for molecular weight control. The following ingredients were placed in a three liter, three neck, round bottom flask equipped wtih stirrer, thermometer, nitrogen inlet and reflux condenser:

| | Parts |
|---|---|
| Water (deoxygenated and nitrogen purged) | 400 |
| Arcrylonitrile (free of inhibitor) | 100 |
| Emulsifier (GAFAC RE–610) | 3.5 |
| Modifier (t-dodecyl mercaptan) | 0.35 |
| $(NH_4)_2S_2O_8$ | 0.50 |
| $Na_2S_3O_5$ | 0.23 |

The polymerization reaction was carried out at 50° C. for a period of 5½ hours with continuous stirring in a nitrogen atmosphere. Polyacrylonitrile was recovered by coagulation with aqueous aluminum sulfate solution and washing by water to remove residual emulsifier. The polymer was dried by the procedure given in Example I.

The procedures of Example I(A) and (B) were repeated using the foregoing acrylonitrile homopolymer and similar results were obtained.

EXAMPLE III

The acrylonitrile polymer of Example I was used along with dimethyl formamide and various diesters of phthalic acid in the preparation of casting solutions from the following recipe:

| | Parts |
|---|---|
| Acrylonitrile polymer | 100 |
| Dimethyl formamide (DMF) | 428 |
| Phthalate ester | Variable |

The phthalate ester and the dimethyl formamide were mixed together and the polymer was added to the mixture. The solution was formed by stirring the polymer-solvent mixture at about 100° C. for about one hour.

The resulting solution or dope was then cast onto a glass plate and spread uniformly with a 30 mil doctor blade.

The resulting film was dried at about 50° C. for about 30 minutes. The dried film was then oriented on a laboratory pantograph using a radiant heater to aid the stretching process. After stretching the film in one direction 2.5 times the original length, the film was turned 90° and stretched in the transverse direction 3.0 times the original transverse dimension. The film was then heat set for one minute at 145° C. while held dimensionally stable in a frame. The physical properties of the oriented films prepared in the foregoing manner are given in Table II.

TABLE II

| Phthalate ester | Percent DMF content after heat set | | | Film appearance |
|---|---|---|---|---|
| | 4 parts | 10 parts | 28 parts | |
| Dimethyl phthalate | 1.1 | ---------- | 0 | Clear. |
| Diethyl phthalate | 1.1 | 0.5 | 0.05 | Do. |
| Dimethyl isophthalate | ---------- | ---------- | 0.2 | Do. |
| Control, 100% dimethylformamide. | ---------- | ---------- | 7.2 | Clear, flexible. |

A repeat of the above employing dimethyl sebacate gave a clear, flexible film having 0.70%, 0.33% and 0% residual dimethyl formamide at 4, 10 and 28 parts of dimethyl sebacate in the starting dopes, respectively. When dibutyl phthalate, dicyclohexyl phthalate and dioctyl phthalate were used in the foregoing procedure, weak films which were not clear resulted indicating that these higher alkyl esters were not compatible with the polyacrylonitrile.

We claim:

1. The process for preparing an impact resistant nitrile polymer film comprising
   (a) forming a film from a mixture of
      (1) a nitrile polymer selected from the group consisting of homopolymers and copolymers of a nitrile monomer having the structure

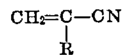

wherein R is a member selected from the group consisting of a hydrocarbon group, hydrogen or a halogen, said copolymer containing up to 10% by weight of a monomer copolymerizable with the nitrile monomer,
      (2) dimethyl formamide wherein there is present from about 10 to 30% by weight of nitrile polymer based on the weight of dimethyl formamide, and
      (3) a lower alkyl ester of a polycarboxylic acid having the structure $R(COOR')_n$ wherein R is a hydrocarbon radical having from 5 to 8 carbon atoms, R' is an alkyl group having from 1 to 3 carbon atoms and $n$ is an integer of from 2 to 4; and said lower alkyl ester being present in from about 1 to 30% by weight based on the weight of nitrile polymer; and
   (b) biaxially orienting said film; and
   (c) drying said film so that it is substantially free of dimethyl formamide.

2. The process of claim 1 wherein the nitrile monomer is acrylonitrile.

3. The process of claim 2 wherein (a)(3) is dimethyl phthalate.

4. The process of claim 2 wherein (a)(3) is diethyl phthalate.

5. The process of claim 2 wherein (a)(3) is dimethyl sebacate.

6. The process of claim 2 wherein (a)(3) is dimethyl isophthalate.

7. The biaxially oriented film produced by the process of claim 1.

References Cited

UNITED STATES PATENTS 2,426,728 9/1947 D'Alelio.
2,786,043 3/1957 Schuller et al.
2,814,603 11/1957 Pirot.
2,953,538 9/1960 Lyman.
3,172,869 3/1965 Saxon.
3,253,058 5/1966 Isley et al. ---------- 264—216
3,329,644 7/1967 Baur et al.

OTHER REFERENCES

Doolittle: The Technology of Solvents & Plasticizers, John Wiley & Sons, Inc., New York (1954), pp. 951 and 977.

ALLAN LIEBERMAN, *Primary Examiner.*

U.S. Cl. X.R.

260—32.6; 264—210, 211, 216